US006209085B1

(12) United States Patent
Hammond et al.

(10) Patent No.: US 6,209,085 B1
(45) Date of Patent: Mar. 27, 2001

(54) METHOD AND APPARATUS FOR PERFORMING PROCESS SWITCHING IN MULTIPROCESSOR COMPUTER SYSTEMS

(75) Inventors: Gary N. Hammond, Campbell; Koichi Yamada, San Jose, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/927,215

(22) Filed: Sep. 11, 1997

Related U.S. Application Data

(63) Continuation of application No. 08/437,081, filed on May 5, 1995, now abandoned.

(51) Int. Cl.[7] ................................................. G06F 9/312
(52) U.S. Cl. ......................... 712/244; 712/243; 712/225; 712/228
(58) Field of Search .................................. 709/100, 101, 709/102, 103, 104; 712/205, 243, 244, 225, 228

(56) References Cited

U.S. PATENT DOCUMENTS

| 3,913,070 | * | 10/1975 | Malcolm et al. | 709/104 |
|---|---|---|---|---|
| 4,084,224 | * | 4/1978 | Appell et al. | 709/100 |
| 4,646,236 | * | 2/1987 | Crockett et al. | 710/45 |
| 5,442,761 | * | 8/1995 | Toda et al. | 712/205 |
| 5,928,356 | * | 7/1999 | Golliver et al. | 714/5 |

OTHER PUBLICATIONS

*Pentium™ Processor User's Manual, vol. 3: Architecuture and Programming Manual*, Intel Corporation, 1993, pp. 6–1–6–45, 11–1–11–25, 13–1–13–15, and 14–1–14–27.
"Inside Windows NT" Helen Custer, Microsoft 1993 pp. 15–25.*
"Inside Windows NT" by Helen Custer Microsoft Press., 1993 pp. 90–102.*
"Distributed Operating Systems, The Logical Design" by A. Goscinski, Addison–Wesley Publishing Company, pp. 409–425.*

* cited by examiner

*Primary Examiner*—Majid Banankhah
(74) *Attorney, Agent, or Firm*—Blakely, Sokoloff, Taylor & Zafman LLP (57) ABSTRACT

A method and apparatus for reducing the amount of data copied during process switches. A method for reducing the amount of data copied during process switches is provided. In response to a processor performing a process switch to a process, a first write indication corresponding to the process is stored to indicate a first register file in the processor should not be saved. In response to the process causing the processor to write to the first register file, the first write indication is altered to indicate the first register file should be saved. In response to the processor performing a process switch from the process, a first value stored in the first register file is copied into a storage device accessible by the processor if the first write indication indicates the first register file should be saved.

According to another aspect of the present invention, in response to a processor performing a process switch to a process, it is determined whether the process is likely to cause the processor to touch a first register file contained in the processor. If it was determined the process is likely to cause the processor to touch the first register file, a first value stored in a storage device accessible by the processor is loaded into the first register file. A first load indication is stored to indicate whether the first value was loaded in the preceding step. In response to the process attempting to cause the processor to touch the first register file while the first load indication indicates the first value is not loaded, the first value stored in the storage device is loaded into the first register file and the first load indication is altered to indicate the first value was loaded.

21 Claims, 5 Drawing Sheets

METHOD AND APPARATUS FOR PERFORMING PROCESS SWITCHING IN MULTIPROCESSOR COMPUTER SYSTEMS

This is a continuation of application Ser. No. 08/437,081, filed May 5, 1995, now abandoned.

BACKGROUND OF THE INVENTION

1. Field of the Invention

The present invention relates to the field of computers, particularly to the area of process switching in multiprocessor computer systems.

2. Description of the Related Art

A processor comprises a number of registers contained in its register set for use during the execution of a process. The contents of these registers at any given time during the execution of a process is referred to as the "register state" of that process. Through the use of an operating system, many processors are capable of multitasking several processes using techniques such as cooperative multitasking, time-slice multitasking, etc. While multitasking several processes, a process's register state must be preserved (i.e., stored in a storage device) during the execution of other processes so that the process's register state may be loaded back into the processor and execution of that process may be resumed. When a processor switches from one process to another, a process switch (also termed as a "context switch" or a "task switch") is said to have occurred.

Today, certain computer systems have more than one processor. Such computer systems are commonly referred to as multiprocessor computer systems. In many multiprocessor systems, a processor cannot access the registers of the other processors in the system, but must communicate with the other processors through a common storage area. In addition, many multiprocessor systems allow processes to "migrate" between processors (i.e., a processor may resume the execution of a process which was partially executed on a different processor). To allow a process to migrate from a first processor to a second processor, its current register state must be stored in the common storage area so that the second processor may access it. For example, after a first processor partially executes a first process, it may perform a process switch to a different process. As a result, this partially executed first process will be idle. In a single processor computer system, this first process must remain idle until the first processor returns to it. However, in a multiprocessor computer system, if the first processor stores the current register state of the first process in the common storage area, a second processor may access the common storage area and resume processing the first process from the point where the first processor left off.

One method in the prior art for preserving register states requires, upon the occurrence of every process switch, the saving of the previous process's entire register state in a common storage device and the loading of the next processes entire register state. As a result, the current register state of a process is always stored in the common storage area and is always available to the other processors. One problem with this method is that it requires a significant amount of save/load overhead during each process switch because of the large number of registers in a processor. It is likely future processors will contain even more registers.

A second method in the prior art for preserving register states in a single processor system employs disable bits for certain "register files" (i.e., groupings of registers—e.g., the floating point registers may be grouped as the floating point register file). According to this second method, the contents of the floating point register file are not saved or loaded as part of a process's register state during process switches, but the floating point register file is assigned a disable bit. Initially, this disable bit is set to indicate the floating point register file is enabled. In response to a first process utilizing the floating point register file, the disable bit is set to indicate the floating point register file is disabled. During a process switch from the first process, only that portion of the register state of the first process which is not stored in the floating point register file is stored in a storage device. When and if a second process attempts to utilize the floating point register file, the contents of the floating point register file are saved in the storage device and that portion of the register state for the second process which corresponds to the floating point register file is loaded into the register file. However, if no other processes utilize the floating point register file while the first process is not executing, the floating point register file is not saved or loaded. In this manner, disable bits permit the operating system to delay, and possibly avoid, the saving and loading of the floating point register file. Thus, process switch overhead is reduced by reducing the number of registers which must be saved and loaded.

A problem with the second prior art method described above is that a portion of a process' register state may be resident only in the floating point register file of the original processor (i.e., the values in the floating point register file of the original processor are not copied into memory until, if ever, a subsequent process executing on the original processor attempts to utilize the original processor's floating point register file). If a portion of the processor's register state is resident only in the original processor, a different processor cannot access the process' current register state (i.e., a processor cannot access a different processor's registers) and, therefore, the process cannot migrate. As a result, this prior art method is difficult to implement in a multiprocessor computer system, and when implemented in a multiprocessor computer system does not allow process' to freely migrate.

SUMMARY OF THE INVENTION

A method for reducing the amount of data copied during process switches is provided. According to one aspect of the invention, in response to a processor performing a process switch to a process, a first write indication corresponding to the process is stored to indicate a first register file in the processor should not be saved. In response to the process causing the processor to write to the first register file, the first write indication is altered to indicate the first register file should be saved. In response to the processor performing a process switch from the process, a first value stored in the first register file is stored in a storage device accessible by the processor if the first write indication indicates the first register file should be saved.

According to another aspect of the present invention, in response to a processor performing a process switch to a process, it is determined whether the process is likely to cause the processor to touch a first register file contained in the processor. If it was determined the process is likely to cause the processor to touch the first register file, a first value stored in a storage device accessible by the processor is loaded into the fast register file. A first load indication is stored to indicate whether the first value was loaded in the preceding step. In response to the process attempting to cause the processor to touch the first register file while the first load indication indicates the first value is not loaded, the first value stored in the storage device is loaded into the first register file and the first load indication is altered to indicate the first value was loaded.

According to another aspect of the present invention, an apparatus for reducing the amount of data copied during process switches is provided. The apparatus generally includes processor comprising a first storage area and a second storage area. The second storage area storing therein a first indication indicating whether, since a process switch to a process currently executing on the processor, the process has instructed the processor to write to the first storage area. According to another aspect of the present invention, the processor further comprising an execution unit which, in response to the process instructing the processor to write to the first storage area, alters the first indication to indicate the process has instructed the processor to write to the first storage area. According to another aspect of the present invention, the processor further comprises a third storage area. The third storage area storing therein a second indication indicating whether, since the process switch, the process has instructed the processor to touch the first storage area. In response to the process instructing the processor to touch the first storage area while the second indication indicates the process has not yet instructed the processor to touch the first storage area, the execution unit loads a second value into the first storage area and alters the second indication accordingly.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the present invention. However, it is understood that the present invention may be practiced without these specific details. In other instances, well-known circuits, structures and techniques have not been shown in detail in order not to unnecessarily obscure the present invention.

Although a more detailed explanation will be provided below, it is thought worthwhile to first provide a brief overview of the present invention. In this application, a method and apparatus for reducing the save/load overhead incurred during process switches in a multiprocessor computer system is described. To accomplish this, the present invention employs register use indication bits, specifically, write bits and/or load bits. Write bits are used to avoid the unnecessary saving of their corresponding register file during process switches, while load bits are used to avoid the unnecessary loading of their corresponding register files.

It is thought worthwhile to note that the term "load" is used herein to refer to the storing of the current register state of a process in the registers of a processor. In contrast, a process instructs a processor to "write" to a register when that process contains an instruction which stores a value in that register and the processor processes that instruction. In addition, a process instructs a processor to "touch" a register when that process contains an instruction which accesses (i.e., reads or writes) a register and the processor processes that instruction. Thus, a process may touch a register without writing to it (i.e., by reading it). Of course, a process which writes to a register touches that register. For purposes of the present application, a process is not said to touch a register when loading the current register state of a process.

One Embodiment of the Present Invention

Overview of One Embodiment of the Present Invention

To ease understandings of the present invention, one embodiment will be described in which one register file in a processor is assigned a write bit and a load bit. However, the present invention may be utilized for multiple register files by utilizing multiple write and load bits. For example, the present invention may be utilized for an integer register file, a floating point register file, and a segmentation register file by providing a write bit and a load bit for each. In addition, the present invention is not limited to register files, but may be utilized for a single register or any grouping of registers.

During a process switch to a process, the write bit is altered to indicate its corresponding register file should not be saved during the next process switch. During execution of this process, the write bit is altered to indicate its corresponding register file should be saved if the process instructs the processor to write to this register file. During the next process switch (i.e., a process switch away from this process), the contents of the register file are stored in a common storage device as part of the process's current register state only if the write bit indicates its corresponding register file should be saved. Otherwise, the write bit's corresponding register file is not saved and the process switch overhead is reduced. As a result, the use of write bits results in a significant performance optimization while allowing another processor to access the process's current register state.

While the write bit is used to avoid the unnecessary saving of the register file, the load bit is used to avoid the unnecessary loading of the register file. During process switches, the operating system: 1) loads the register file only if it is likely the next process will touch the register file; and 2) alters the load bit to reflect whether the register file was loaded. If a process does not instruct the processor to touch the register file and the register file was not loaded, the loading of the register file was avoided. Thus, when the operating system correctly anticipates a register file will not be accessed, the load overhead is reduced and performance is optimized. However, if the process instructs the process to touch the register file, the register file's associated load bit is checked to determine if the register file has been loaded. If the load bit indicates the register file has been loaded, execution of the process continues. However, if the register file has not yet been loaded, the operating system is invoked by an event to load the accessed register file from the process's context structure and alter the load bit accordingly. Thus, when the operating system correctly anticipates a register file will be accessed, the above mentioned event is avoided because the register file was loaded at the process switch. This provides additional optimization of the system because it is mom efficient to load a register file during the process switch, than to use the event handling mechanism. As a result, the use of load bits results in a significant performance optimization while allowing another processor to access the process's current register state.

Further Description of One Embodiment of the Present Invention

Figure 1:
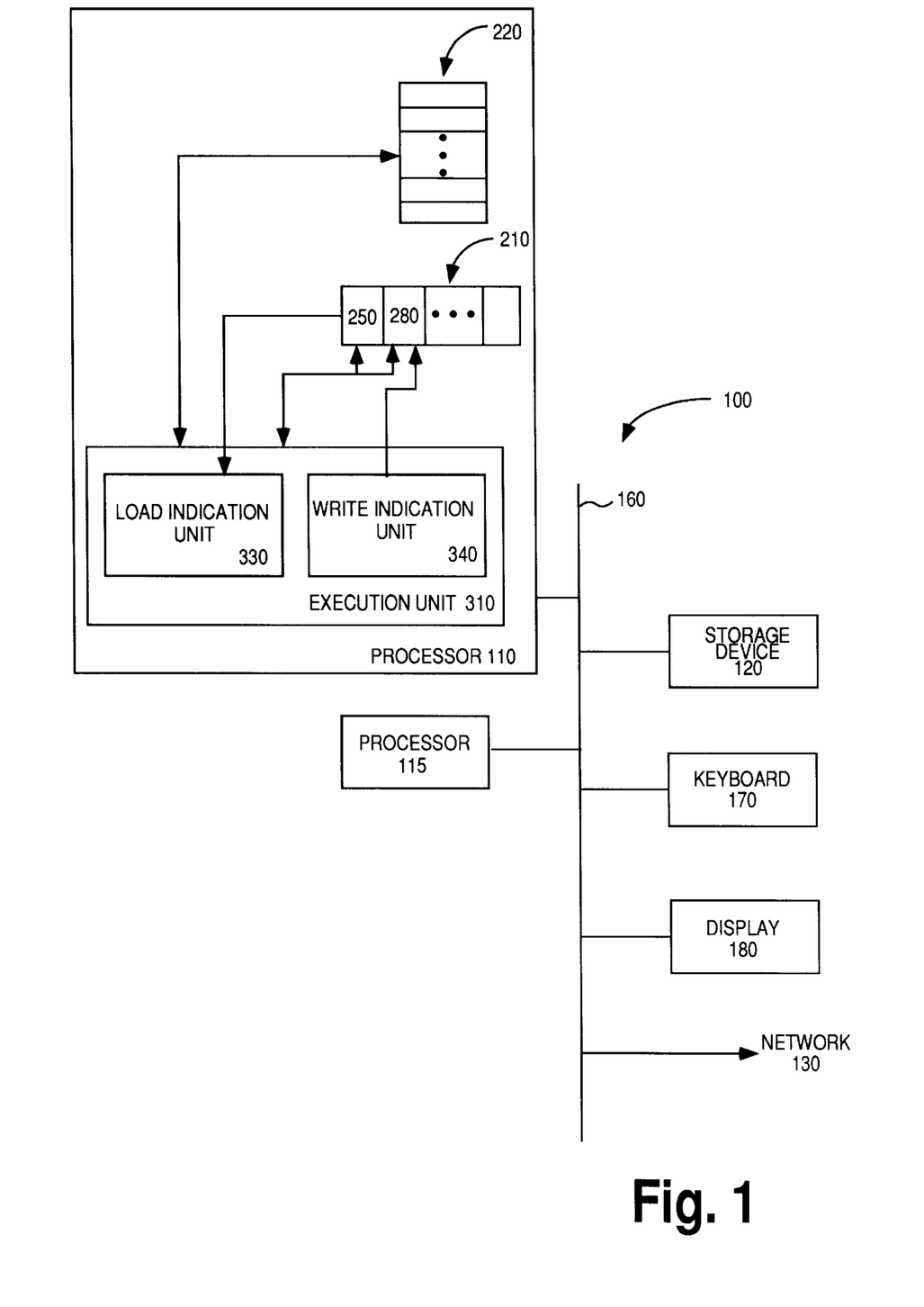
FIG. 1 is a diagram illustrating a multiprocessor computer system as may be utilized by the present invention.

Referring now to FIG. 1, a block diagram illustrating an exemplary computer system 100 incorporating the teachings of the present invention is shown. The exemplary computer system comprises a processor 110, a processor 115, a storage device 120, a network 130, and a bus 160. Processor 110 is coupled to storage device 120 and network 130 by bus 160. In addition, a number of user input/output devices, such as a keyboard 170 and a display 180, are also coupled to bus 160. Both processor 110 and processor 115 contain a register set and represent central processing units of any type of architecture, including CISC or RISC architectures. In addition, storage device 120 generally represents one or more mechanisms for storing data which is accessible by all processors in the computer system. For example, storage device 120 may include read only memory (ROM), random access memory (RAM), and a magnetic disk storage medium. While one embodiment of the present invention is described which contains two processors, the present invention may be implemented on a computer system with any number of processors, including a single processor computer system.

FIG. 1 also illustrates that processor 110 comprises a register file 220, a control register 210, and an execution unit 310. Of course, processor 110 contains additional circuitry which is not shown so as to not obscure the present invention. Execution unit 310 is used for executing instructions and includes a write indication unit 340 and a load indication unit 330, the operation of which will be described later. FIG. 1 also shows control register 210 containing a write bit 280 and a load bit 250. Write bit 280 (also referred to herein as the "write indication") is used to indicate whether the contents of register file 220 should be saved during the next process switch. Load bit 250 (also referred to herein as the "load indication") is used to indicate whether register file 220 has been loaded since the previous process switch. Processor 115 may be identical to processor 110. While one embodiment is described which uses one register file with a corresponding write bit and load bit, alternative embodiments could have any number of register files, each of which has a corresponding write bit and/or load bit. In addition, certain embodiments may not utilize the load bit while others may not utilize the write bit.

Figure 2:
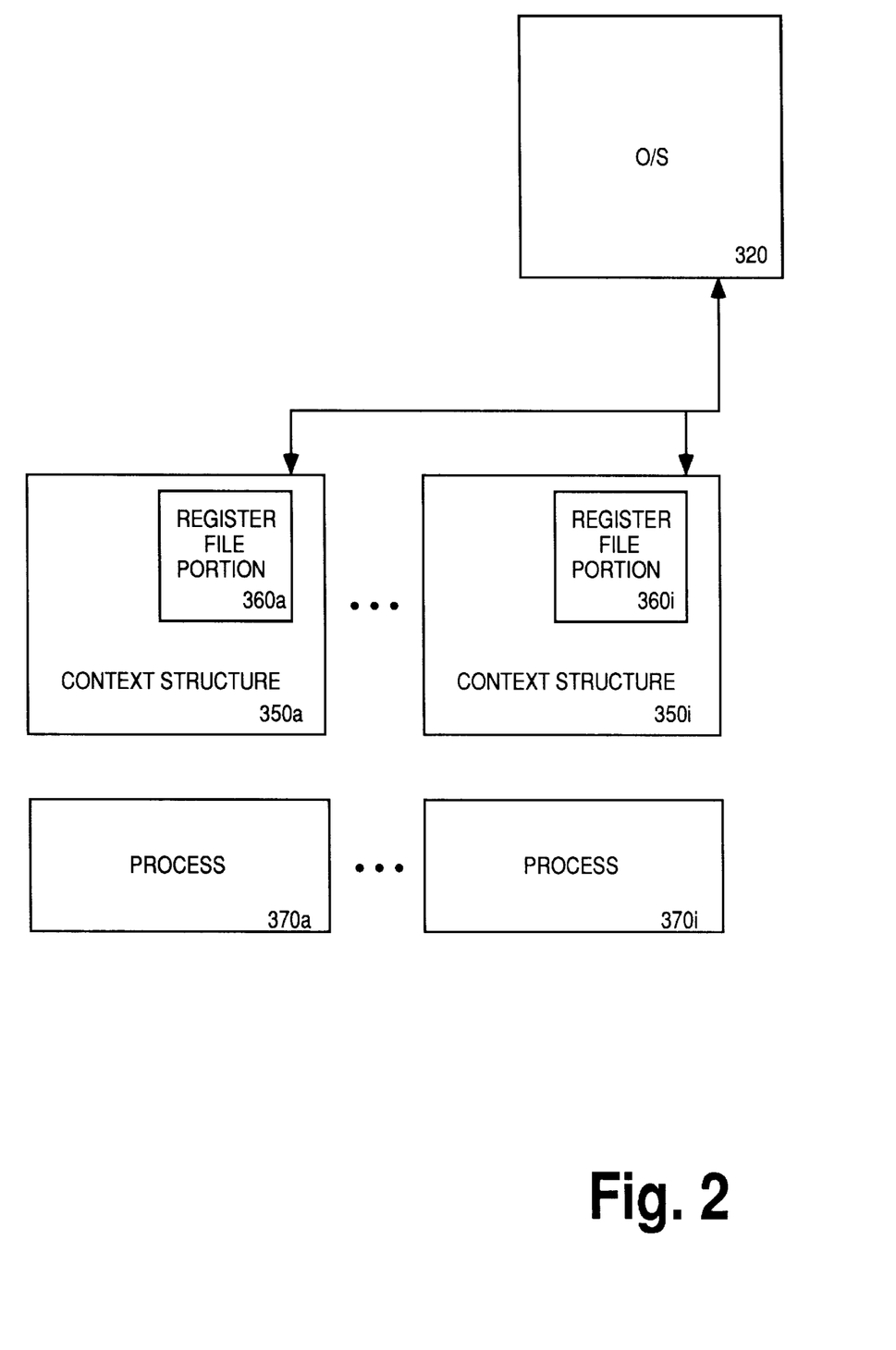
FIG. 2 is a conceptual block diagram showing an example of the information stored in storage device 120 of FIG. 1 according to one embodiment of the present invention.

FIG. 2 is a conceptual block diagram showing an example of the information stored in storage device 120 of FIG. 1 according to one embodiment of the present invention. FIG. 2 shows an operating system 320 and processes 370a–i. Operating system 320 controls the allocation and usage of hardware resources such as memory, central processing unit time, disk space, peripheral devices, etc. Each of processes 370a–i represents a routine executing on processor 110. As will be described later, operating system 320 maintains context structures 350a–i, each of which corresponds to one of processes 370a–i (e.g., context structure 350a corresponds to process 370a). Each of these context structures represents a data structure storing its process's current register state while its process is not executing, thereby allowing for the execution of its process to be resumed. In addition, each of context structures 350a–i is shown containing a register file portion 360x (e.g., context structure 350a contains register file portion 360a, etc.) in which the portion of the register state corresponding to register file 220 is stored.

During a process switch, a processor switches from processing a previously selected process to processing a currently selected process. In one embodiment, operating system 320 executing on processor 110 performs the saving of the register state of the previously selected process and the loading of the register state of the currently selected process during process switches. However, alternative embodiments could implement process switching any number of ways, including circuitry, microcode and/or other routines. During each process switch, operating system 320 executing on execution unit 310 performs the following steps: 1) stores the contents of processor 110's register set, excluding register file 220, in the context structure corresponding to the previously selected process; 2) stores the contents of register file 220 in the register file portion of the context structure corresponding to the previously selected process if the write bit 280 indicates the contents of register file 220 should be saved; 3) loads the register set of processor 110, excluding register file 220, with the register state stored in the context structure corresponding to the currently selected process; 4) loads register file 220 with the register file portion of the context structure corresponding to the currently selected process if it determines the currently selected process is likely to instruct processor 110 to touch register file 220 (this aspect of the present invention will be later described with reference to FIG. 5); 5) alters load bit 250 to indicate whether register file 220 was loaded, and 6) alters write bit 280 to indicate register file 220 should not be saved during the next process switch.

If, during execution, a process attempts to touch a register file, load indication unit 330 inspects load bit 250 and causes the following to occur if load bit 250 indicates register file 220 has not been loaded: 1) register file 220 to be loaded; and 2) the state of load bit 250 to be altered accordingly. While load indication unit 330 is conceptually shown as a block in FIG. 1 for convenience sake, in one embodiment load indication unit 330 is implemented using microcode. Processor 110 decodes each instruction it executes into a microcode sequence, and then performs the microcode sequence using execution unit 310. In this embodiment, those microcode sequences for instructions which read and/or write to register file 220 contain a microcode instruction which, when executed, inspects load bit 250 and generates an event if load bit 250 indicates register file 220 has not been loaded. That event is delivered to the operating system by processor 110's event handling mechanism (for a further description of event handling mechanisms, see Shanley, Tom and Anderson, Don, *ISA System Architecture*, published by MindShare, Inc., 1993). The operating system loads into register file 220 the register file portion of the context structure corresponding to the currently selected process, alters load bit 250 to indicate register file 220 has been loaded, and instructs the processor to resume execution. As a result, when processor 110 executes an instruction which reads and/or writes to register file 220, register file 220 is loaded and load bit 250 is altered if necessary. While one embodiment is described in which the operating system alters load bit 250 and loads register file 220, alternative embodiments could implement load indication unit 330 to alter the state of load bit 250 and/or load register file 220. In addition, alternative embodiments may implement load indication unit 330 in any number of ways, including circuitry and/or a routine.

If, during the execution, a process writes to a register file, write indication unit 340 alters the state of write bit 280 accordingly—i.e., if a process instructs processor 110 to write (irrespective of whether it instructs processor 110 to read from register file 220) register file 220, write indication unit 340 alters the state of write bit 280 to indicate register file 220 should be saved during the next process switch. While write indication unit 340 is conceptually shown as a block in FIG. 1 for convenience sake, in one embodiment write indication unit 340 is implemented using microcode. In this embodiment, those microcode sequences for instructions which write to register file 220 contain a microcode instruction which alters write bit 280 to indicate register file 220 should be saved. As a result, when a processor 110 executes instructions which write to register file 220, write bit 280 is set accordingly. Alternative embodiment, may implement write indication unit in any number of ways, including a combination of circuitry, microcode, and/or a software routine. For example, in an alternative embodiment, write indication unit 340 is implemented as a circuit on processor 110 which alters write bit 280 in response to a value being stored in register file 220.

Having described the various elements of one embodiment of the present invention, its overall operation will now be described with reference to FIGS. 3, 4, and 5. To further illustrate the operation of this embodiment, an example in which process 370a is currently executing on processor 110 will be described.

Figure 3:
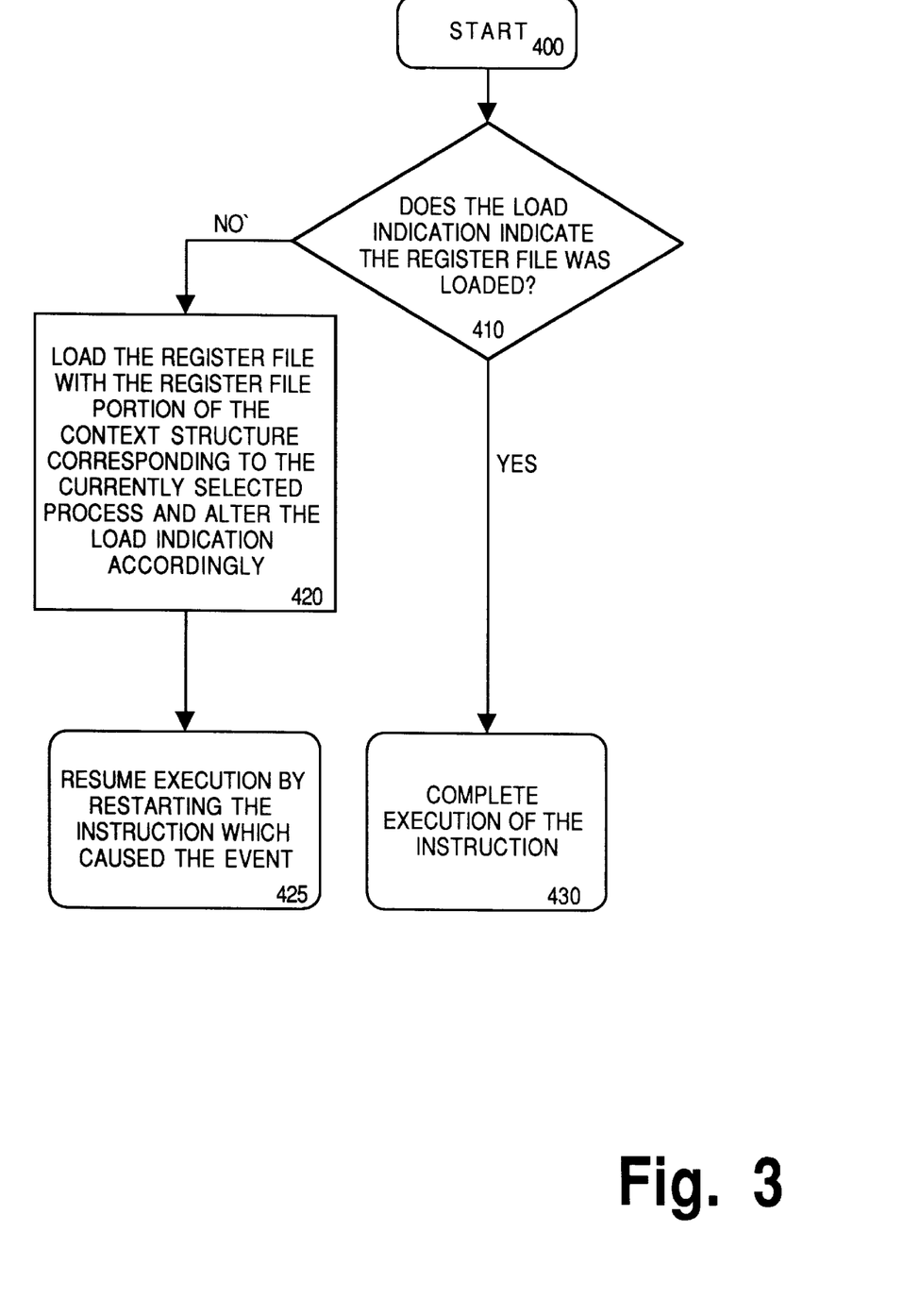
FIG. 3 is a flow diagram illustrating the operation of the execution unit of FIG. 1 during the execution of an instruction which reads, but does not write, to a register file.

With reference to FIG. 3, the operation of the execution unit of FIG. 1 during the execution of an instruction which reads, but does not write, to a register file will be described.

As shown in step 410, the determination is made whether the load indication indicates the register file has been loaded. If the register file has not been loaded, flow passes to step 420. Otherwise, flow passes to step 430. In the present example, load indication unit 330 inspects the state of load bit 250 and causes an event if load bit 250 indicates register file 220 has not been loaded.

At step 420, the register file is loaded with the register file portion of the context structure corresponding to the currently selected process and the load indication is set accordingly. From step 420, flow passes to step 425. In the present example, processor 110's event handling mechanism delivers the event to operating system 320 which loads register file 220 with register file portion 360a and alters load bit 250 to indicate register file 220 has been loaded, as previously described. Upon completion, operating system 320 instructs processor 110 to resume execution by restarting at the instruction which caused the event.

As shown in step 425, execution is resumed by restarting the instruction which caused the event. By restarting the instruction which caused the event, the steps in FIG. 3 will be performed again, but the register file will have been loaded and the load indication will indicate as such.

At step 430, execution of the instruction is completed.

In this manner, load indication unit 330 is used to delay, and possibly avoid, the loading of a register file and therefore reduces the save/load overhead of process switches.

Figure 4:
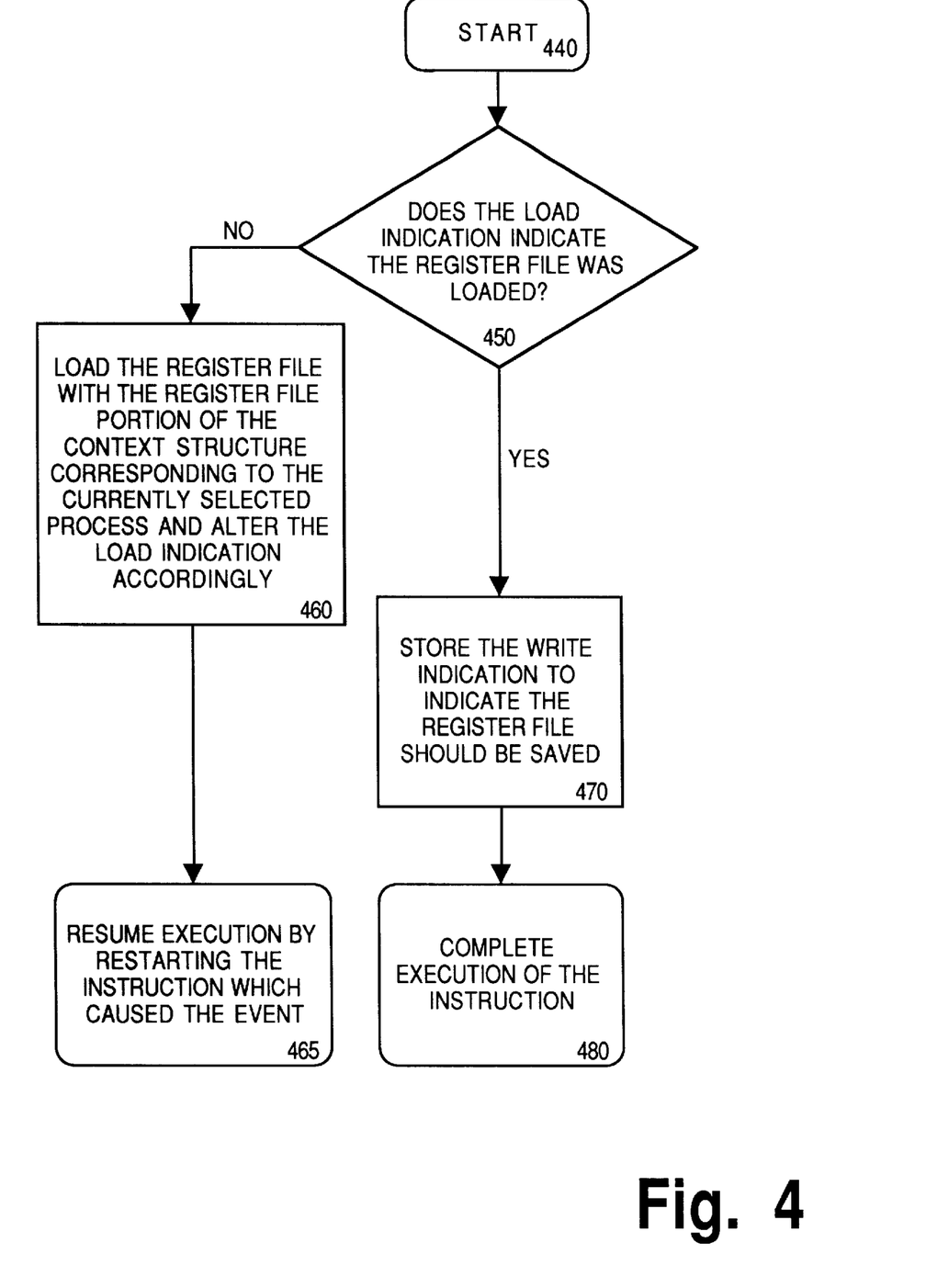
FIG. 4 is a flow diagram illustrating the operation of the execution unit of FIG. 1 during the execution of an instruction which writes to a register file.

With reference to FIG. 4, the operation of the execution unit of FIG. 1 during the execution of an instruction which writes, to a register file will be described. The flow diagram of FIG. 4, in addition to containing steps equivalent to the steps in FIG. 3, contains additional step 470 as described below.

As shown in step 450, the determination is made whether the load indication indicates the register file has been loaded. If the register file has not been loaded, flow passes to step 460. Otherwise, flow passes to step 470. In the present example, load indication unit 330 inspects the state of load bit 250 and causes an event if load bit 250 indicates register file 220 has not been loaded.

At step 460 the register file is loaded with the register file portion of the context structure corresponding to the currently selected process and the load indication is set accordingly. From step 460, flow passes to step 465. In the present example, processor 110's event handling mechanism delivers the event to operating system 320 which loads register file 220 with register file portion 360a and alters load bit 250 to indicate register file 220 has been loaded, as previously described. Upon completion, operating system 320 instructs processor 110 to resume execution by restarting at the instruction which caused the event.

As shown in step 465, execution is resumed by restarting the instruction which caused the event. By restarting the instruction which caused the event, the steps in FIG. 3 will be performed again, but the register file will have been loaded and the load indication will indicate as such.

At step 470, the state of the write indication is altered to indicate the register file should be saved and flow passes to step 480. In the present example, write indication unit 340 alters write bit 280 to indicate register file 220 has been written to and should be saved, as previously described. In this manner, write indication unit 340 is used to avoid the unnecessary saving of the contents of register file 220.

At step 480, execution of the instruction is completed.

Figure 5:
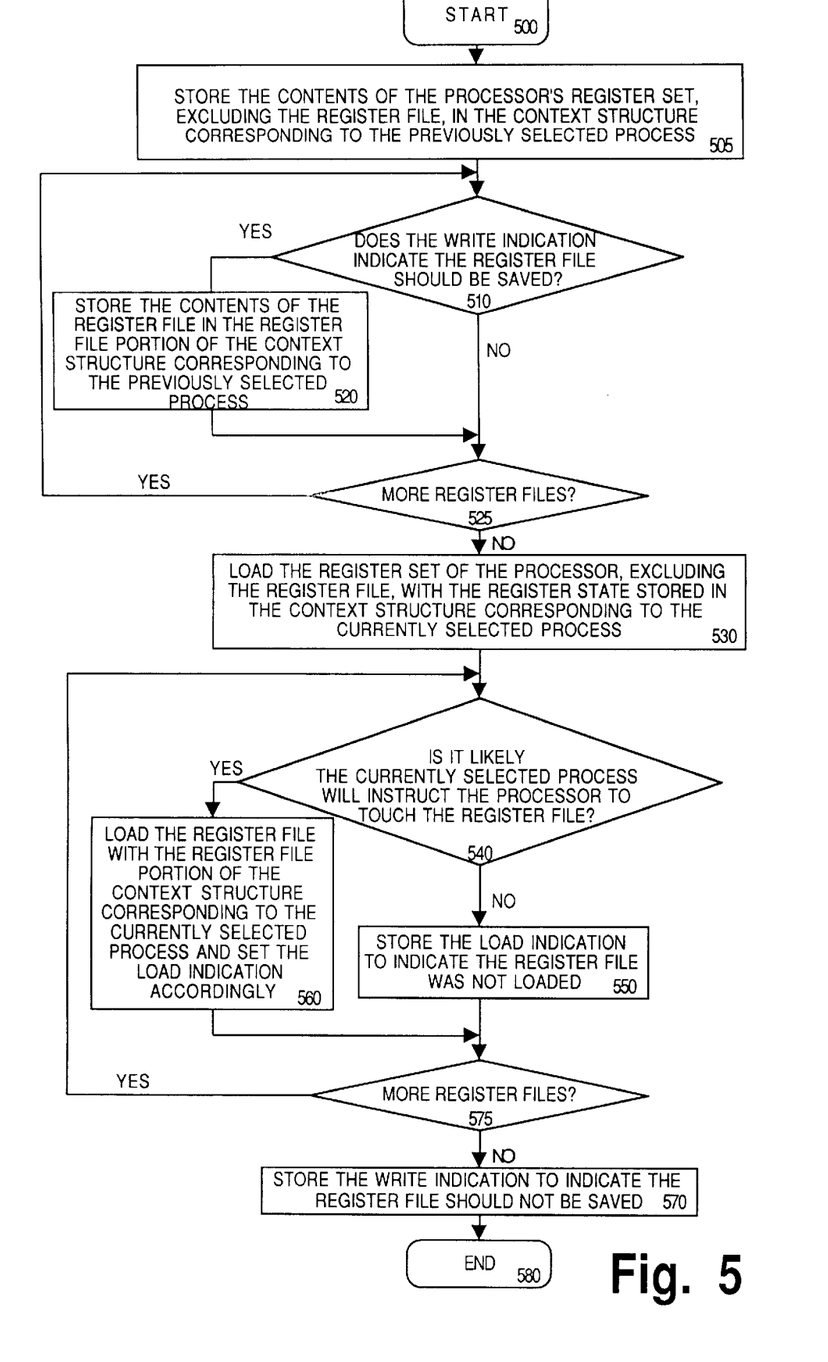
FIG. 5 is a flow diagram illustrating the operation of process switching according to one embodiment of the present invention.

Referring now to FIG. 5, a flow diagram illustrating the operation of operating system 320 during a process switch according to one embodiment of the present invention is shown. To further illustrate the operation of this embodiment, the above example will be continued and a process switch from process 370a to process 37b will be described. Thus, in the present example, the operating system is invoked to perform a process switch and process 370a becomes the previously selected process and process 37b is selected as the currently selected process.

As shown in step 505, the contents of the processor's register set, excluding register file 220, is stored in the context structure corresponding to the previously selected process. Flow then passes to step 510. This step is performed in an embodiment in which certain registers in processor 110 are always stored during a process switch. However, this step may be skipped in an alternative embodiment in which certain registers are not always saved, but are saved based on write bits. In the present example, operating system 320 stores the contents of processor 110's register set, excluding register file 220, in context structure 350a.

At step 510, it is determined whether the write indication indicates the register file should be saved. If the write indication indicates the register file should be saved, flow passes to step 525. Otherwise, flow passes to step 520. Thus, if the previously selected process caused the processor to write to the register file, it contains new information not stored in the register file portion of the corresponding context structure and the write indication will have been set in step 440 to indicate the register file should be saved. However, if the previously selected process did not cause the processor to write to the register file, it does not contain new information and the write indication will indicate the register file should not be saved. In this manner, the save/load overhead of process switches is reduced by avoiding the unnecessary saving of register files. In the present example, operating system 320 inspects write bit 280. If process 370a caused processor 110 to write to register file 220, the write indication was altered to indicate register file 220 should be saved and flow passes to step 520.

As shown in step 520, the contents of the register file are stored in the register file portion of the context structure corresponding to the previously selected process. In the present example, operating system 320 is used to store the contents of register file 220 in register file portion 360a. In this manner, the current register state of process 370a is made available to processor 115. As a result, processor 115 may perform a process switch to process 370a and resume execution from where processor 110 left off. From step 520, flow passes to step 525.

At step 525, the determination is made whether more register files need to be processed. If more register files need to be processed, flow passes back to step 510. Otherwise, flow passes to step 530. In the present example, only one register file has been assigned a load bit and a write bit and flow always passes to step 530. However, alternative embodiments which use multiple load bits and/or write bits for multiple register files play be implemented to perform step 525.

As shown in step 530, the register set of the processor, excluding the register file, is loaded with the register state stored in the context structure corresponding to the currently selected process. From step 530, flow passes to step 540. Similar to step 505, this step is performed in an embodiment in which certain registers are loaded during each process switch. However, this step may be skipped in an alternative embodiment in which certain registers are not always loaded, but are load based on load bits. In the present example, operating system 320 is used to load the register set of processor 110, excluding register file 220, with the register state stored in context structure 350b.

At step 540, the determination is made whether the currently selected process is likely to instruct the processor to touch the register file. If it is determined the currently selected process is not likely to instruct the processor to touch the register file, flow passes to step 550. Otherwise, flow passes to step 560. In the present example, operating system 320 is used to determine the likelihood that process 370b will instruction processor 110 to touch register file 220.

In one embodiment, step 540 is performed by implementing the operating system to maintain a record (i.e., a history) of which register files each process touches. During each context switch, the operating switch loads only those register files which, based on this history, the next process is likely to access. Alternative embodiments could used any number of techniques to perform step 540. In one alternative embodiment, for example, the compiler is implemented to store an indication in each complied program indicating which register files that program is likely to access. Based on this indication, the operating system determines which register files to load.

As shown in step 550, the load indication is stored to indicate the register file was not loaded and flow passes to step 570. In the present example, operating system 320 alters load bit 250 accordingly. As a result, register file 220 will have to be loaded as described in steps 410, 420, 450 and 460 if the currently selected process instructs processor 110 to touch register file 220.

At step 560, the register file is loaded with the register file portion of the context structure corresponding to the currently selected process and the load indication is set accordingly. In the present example, operating system 320 loads register file 220 with register file portion 360b. As a result, if process 370b instructs processor 110 to touch register file 220, it will not need to be loaded. In this manner, when operating system 320 correctly anticipates a register file will be touched, additional optimization of the system is achieved because it is more efficient to load a register file during the process switch, then to use the event handling mechanism. From step 560, flow passes to step 570.

As shown in step 570, the write indication is stored to indicate the contents of the register file should not be saved during the next process switch and the flow passed to step 575. In the present example, operating system 320 alters the write bit 280 accordingly. In this manner, if process 370b does not instruct processor 110 to write to register file 220 during its execution preceding the next process switch, the contents of register file 220 will not be unnecessarily saved.

At step 575, the determination is made whether more register files need to be processed. If more register files need to be processed, flow passes back to step 540. Otherwise, flow passes to step 580. In the present example, only one register file has been assigned a load bit and a disabled bit. However, alternative embodiments which use multiple load bits and/or write bits for multiple register files may be implemented to perform step 575.

At step 580, the flow diagram ends and the operating system allows the currently selected process to be executed by the processor. In the present example, processor 110 begins the execution of process 370b.

These same steps are similarly performed by all processors in multiprocessor computer system 100. Thus, if a process migrates to another processor, the process's current register state may be accessed from storage device 120. For example, processor 115 may perform a process switch to process 370a, by loading process 370a's register state from context structure 350a. In this manner, the write bit and the load bit may be used to reduce the save/load overhead incurred during process switches, thus optimizing performance of the computer system.

Alternative Embodiments

While the present invention has been described in terms of several embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. A processor comprising:
   a storage area to store a first and second piece of data, said first piece of data indicating whether a grouping of registers has been loaded since a most recent process switch, said second piece of data indicating whether execution of said process has instructed said processor to write to said grouping of registers since the most recent process switch; and
   circuitry coupled to said storage area to cause an interrupt responsive to the currently executing process instructing said processor to read or write to said grouping of registers while said first piece of data indicates said grouping of registers has not been loaded, and to alter said second piece of data responsive to the currently executing process instructing said processor to write to said grouping of registers.

2. The processor of claim 1, wherein said circuitry is an execution unit executing microcode instructions.

3. The processor of claim 1, wherein said grouping of registers is used for storing floating point state.

4. The processor in claim 1, wherein during a process switch from a process the contents of the grouping of registers is copied into a storage device only if said second piece of data indicates said process instructed said processor to write to said grouping of registers.

5. The processor of claim 4, wherein:
   said processor loads, in response to said interrupt, a prior processing state into said grouping of registers if said first piece of data indicates said grouping of registers has not been loaded.

6. A computer system comprising:
a storage device having storing therein a first and second routine; and
a first processor coupled to said storage device including:
a storage area to store a first and second piece of data,
a first circuit to alter said first piece of data to indicate a grouping of registers has been written to in response to said processor writing to said grouping of registers, and
a second circuit coupled to said storage area to cause an interrupt to execute said second routine in response to said processor attempting to touch said grouping of registers while said second piece of data indicates a prior state of said grouping of registers has not been loaded;
said first processor, responsive to executing said first routine, to perform a process switch during which said processor stores in said storage device the current state of said grouping of registers only if said first piece of data indicates said grouping of registers has been written and to alter said first piece of data to indicate said grouping of registers has not been written; and
said first processor, responsive executing said second routine, to load into said grouping of registers the prior state of said grouping of registers from said storage device into said grouping of registers and to alter said second piece of data to indicate said grouping of registers has been loaded.

7. The computer system of claim 6, wherein said grouping of registers is used for storing floating point state.

8. The computer system of claim 6,
wherein said processor, responsive to said first routine, to determine whether a next process to be executed is likely to touch said grouping of registers, to load data corresponding to said process into said grouping of registers only if it is determined said process is likely to touch said grouping of registers, and to alter said second piece of data to indicate whether said grouping of registers was loaded.

9. The computer system of claim 6, further comprising:
a second processor coupled to said storage device, said computer system allowing said process to migrate between said first processor and said second processor.

10. The method of claim 6, further comprising the step of:
determining, in response to said first processor performing said first process switch to said first process, whether said first process is likely to cause said first processor to touch said first set of register.

11. A method comprising the computer implemented steps of:
during a process switch by a first processor to a process,
determining that execution of said process is not likely to cause said first processor to read or write to a particular grouping of registers in said first processor, and
loading a prior processing state into registers of said first processor with the exception of at least the particular grouping of registers; and
during execution of said process by said first processor, loading the prior processing state for said particular grouping of registers only if said process instructs said first processor to read from or write to said particular grouping of registers; and
during a second process switch by the first processor, copying a current processing state from registers in said processor.

12. The method of claim 11, wherein said step of copying the current processing state from register in said processor includes the step of avoiding copying of data in said particular grouping of registers.

13. The method of claim 11, wherein the processing state to be stored in said grouping of registers is the floating point state.

14. A method comprising the computer implemented steps of:
during a process switch by a first processor to a process,
loading a prior processing state into registers of said first processor with the exception of at least a particular grouping of registers,
during execution of said process by said first processor, loading into the particular grouping of registers in said first processor the prior processing state for the particular grouping of registers in response to said process instructing said first processor to read or write to said grouping of registers; and
during a process switch by the first processor away from the process,
copying a current processing state from registers in said first processor with the exception of at least said particular grouping of registers, and
copying the current processor state from said particular grouping of registers only if said particular grouping of registers was written to since the process switch by said first processor to said process.

15. The method of claim 14 further comprising the steps of:
during a process switch by a second processor to the process,
loading a prior processing state into registers of said second processor with the exception of at least the particular grouping of registers in said second processor, and
loading prior processing state into said particular grouping of registers if it is determined said process is likely to read or write to said particular grouping of registers;
during execution of said process by said second processor, loading into the particular grouping of registers in said second processor the prior processing state for the particular grouping of registers if the prior processing state has not been loaded and said process instruct said second processor to read or write to said particular grouping of registers; and
during a process switch by the second processor away from said process,
copying a current processing state from registers in said second processor with the exception of at least said particular grouping of registers, and
copying the current processor state from said particular grouping of registers only if said particular grouping of registers was written to since said process switch by said second processor to said process.

16. The method of claim 14, wherein the processing state to be stored in said particular grouping of registers is the floating point state.

17. A method comprising the computer implemented steps of:
during a process switch by a first processor to a process,
loading a prior processing state into registers of said first processor with the exception of any processing state associated with a particular grouping of registers, determining whether execution of said process is likely to read or write to the particular grouping of registers in said first processor, loading the prior processing state for said particular grouping of registers only if it was determined that said process is likely to cause said first processor to read or write to said particular grouping of registers, altering a first piece of data in a control register of said first processor to indicate whether said particular grouping of registers was loaded; and if during execution of said process by said first processor said first piece of data indicates said particular grouping of registers was not loaded and said process instructs said first processor to read from or write to said particular grouping of registers, interrupting execution of said process, loading the prior processing state for said particular grouping of registers, altering said first piece of data to indicate said particular grouping of registers was loaded, and resuming execution of said first process.

18. The method of claim 17, further comprising the steps of:

during a process switch by said first processor away from said process, copying data for resuming execution of said process from registers in said first processor with the exception of at least said particular grouping of registers, and copying data for resuming execution of said process from said particular grouping of registers only if said first piece of data indicates said particular grouping of registers was loaded.

19. The method of claim 17, wherein the processing state to be stored in said grouping of registers is the floating point state.

20. The method of claim 17, further comprising the steps of:

during the first process switch by the first processor to the process, altering a second piece of data in said control register of said first processor to indicate said particular grouping of registers need not be saved;

if during execution of said process by said first processor said process instructs said first processor to write to said particular grouping of registers, altering said second piece of data to indicate said particular grouping of registers should be saved; and during a process switch by said first processor away from said process, copying data for resuming execution of said process from registers in said first processor with the exception of at least said particular grouping of registers, and copying data for resuming execution of said process from said particular grouping of registers only if said second piece of data indicates said particular grouping of registers should be saved.

21. The method of claim 20 further comprising the steps of:

during a process switch by a second processor to the process, loading a prior processing state into registers of said second processor with the exception of at least the particular grouping of registers in said second processor, and loading prior processing state into said particular grouping of registers if it is determined said process is likely to read or write to said particular grouping of registers;

during execution of said process by said second processor, loading into the particular grouping of registers in said second processor the prior processing state for the particular grouping of registers if the prior processing state is not loaded and said process instructs said second processor to read or write to said particular grouping of registers; and during a process switch by the second processor away from said process, copying a current processing state from registers in said second processor with the exception of at least said particular grouping of registers, and copying the current processor state from said particular grouping of registers only if said particular grouping of registers was written to since said process switch by said second processor to said process.

* * * * *